US012632521B2

(12) United States Patent
Almasan et al.

(10) Patent No.: US 12,632,521 B2
(45) Date of Patent: May 19, 2026

(54) SECURED INTELLIGENT IDENTITY VERIFICATION THROUGH BLOCKCHAIN

(71) Applicant: TEACHERS INSURANCE AND ANNUITY ASSOCIATION OF AMERICA, New York, NY (US)

(72) Inventors: Rares Ioan Almasan, Paradise Valley, AZ (US); Sonam Jha, Short Hills, NJ (US); Sastry Vsm Durvasula, Phoenix, AZ (US); Swatee Singh, Livingston, NJ (US)

(73) Assignee: TEACHERS INSURANCE AND ANNUITY ASSOCIATION OF AMERICA, New York, NY (US)

( * ) Notice: Subject to any disclaimer, the term of this patent is extended or adjusted under 35 U.S.C. 154(b) by 197 days.

(21) Appl. No.: 18/404,128

(22) Filed: Jan. 4, 2024

(65) Prior Publication Data

US 2025/0225214 A1 Jul. 10, 2025

(51) Int. Cl.
| | |
|---|---|
| *G06F 21/31* | (2013.01) |
| *G06F 16/951* | (2019.01) |
| *H04L 67/1097* | (2022.01) |
| *H04L 67/306* | (2022.01) |

(52) U.S. Cl.
CPC ............ *G06F 21/31* (2013.01); *G06F 16/951* (2019.01); *H04L 67/1097* (2013.01); *H04L 67/306* (2013.01)

(58) Field of Classification Search
None
See application file for complete search history.

(56) References Cited

U.S. PATENT DOCUMENTS

| | | | | |
|---|---|---|---|---|
| 11,741,527 B1 * | 8/2023 | Esclusa | .............. | G06Q 30/0633 |
| | | | | 705/26.8 |
| 2020/0067907 A1 * | 2/2020 | Avetisov | ............... | H04L 67/133 |
| 2020/0382304 A1 * | 12/2020 | Hsiao | .................. | G06F 16/1824 |
| 2021/0329009 A1 * | 10/2021 | Chen | ..................... | H04L 63/126 |
| 2023/0206219 A1 * | 6/2023 | Khuong | ............. | G06Q 20/3825 |
| | | | | 705/75 |
| 2023/0368206 A1 * | 11/2023 | Turgeman | ............... | G06F 21/32 |
| 2023/0370269 A1 * | 11/2023 | Thai | ....................... | H04L 9/3218 |
| 2023/0419308 A1 * | 12/2023 | Madisetti | ............... | G06Q 20/38 |
| 2024/0062193 A1 * | 2/2024 | Zhang | .................. | H04L 9/0825 |

* cited by examiner

*Primary Examiner* — Chris Parry
*Assistant Examiner* — Abderrahmen Chouat
(74) *Attorney, Agent, or Firm* — MARSHALL, GERSTEIN & BORUN LLP; Randall G. Rueth

(57) ABSTRACT

The following generally relates to distributed ledger and artificial intelligence (AI) technology, and more particularly relates to identity verification through distributed ledger and/or AI technology. In some embodiments, one or more processors: receive, from a user device of a user, user-provided identity information; scrape, from a website, data of the user; add the scraped data of the user to a distributed ledger; and attempt to authenticate the user by inputting, into a smart contract stored on the distributed ledger: (i) the user-provided identity information, and (ii) the scraped data of the user added to the distributed ledger.

19 Claims, 11 Drawing Sheets

500 510

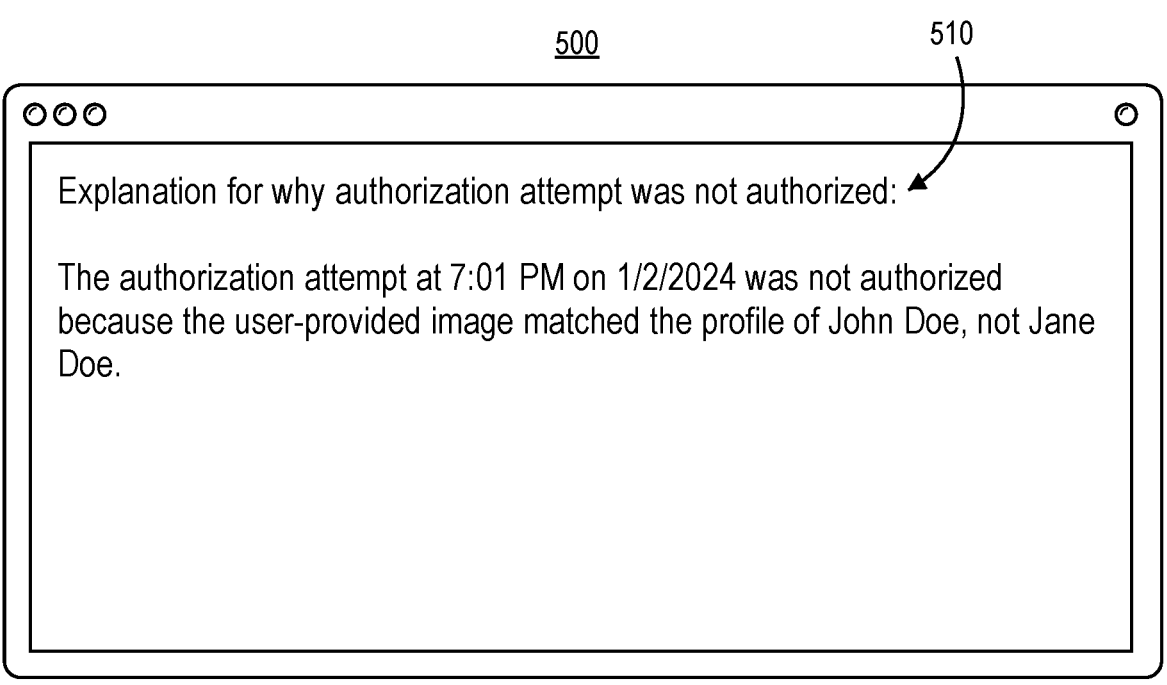

Explanation for why authorization attempt was not authorized:

The authorization attempt at 7:01 PM on 1/2/2024 was not authorized because the user-provided image matched the profile of John Doe, not Jane Doe.

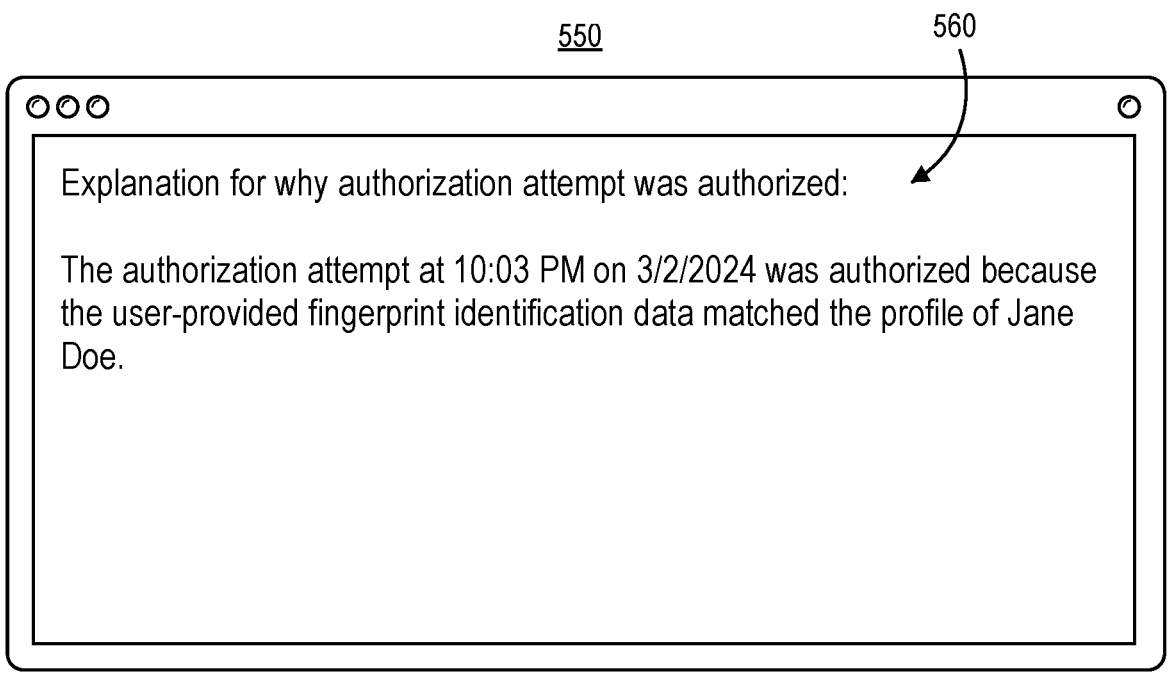

Explanation for why authorization attempt was authorized:

The authorization attempt at 10:03 PM on 3/2/2024 was authorized because the user-provided fingerprint identification data matched the profile of Jane Doe.

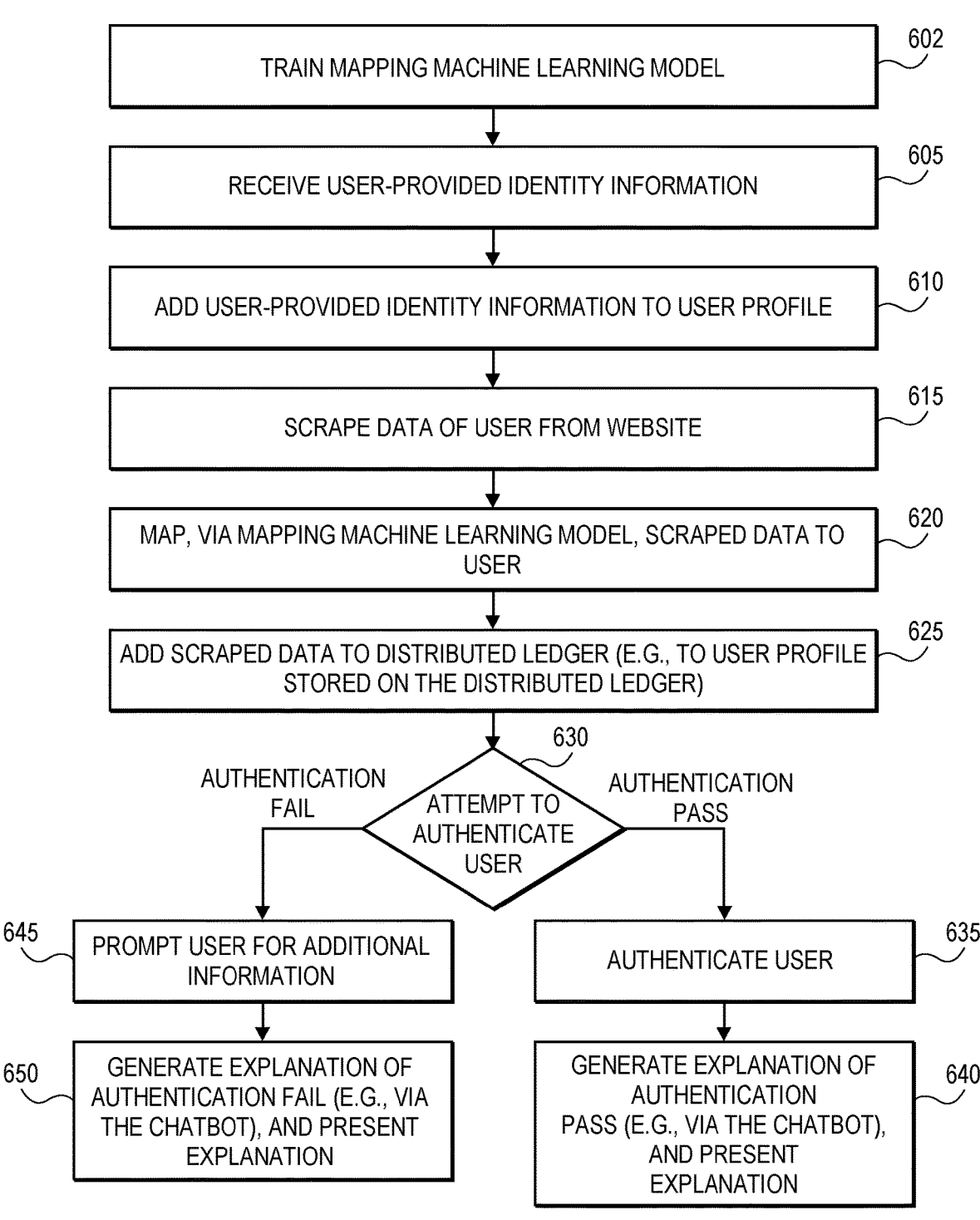

602 TRAIN MAPPING MACHINE LEARNING MODEL

605 RECEIVE USER-PROVIDED IDENTITY INFORMATION

610 ADD USER-PROVIDED IDENTITY INFORMATION TO USER PROFILE

615 SCRAPE DATA OF USER FROM WEBSITE

620 MAP, VIA MAPPING MACHINE LEARNING MODEL, SCRAPED DATA TO USER

625 ADD SCRAPED DATA TO DISTRIBUTED LEDGER (E.G., TO USER PROFILE STORED ON THE DISTRIBUTED LEDGER)

630 ATTEMPT TO AUTHENTICATE USER

AUTHENTICATION FAIL

AUTHENTICATION PASS

645 PROMPT USER FOR ADDITIONAL INFORMATION

635 AUTHENTICATE USER

650 GENERATE EXPLANATION OF AUTHENTICATION FAIL (E.G., VIA THE CHATBOT), AND PRESENT EXPLANATION

640 GENERATE EXPLANATION OF AUTHENTICATION PASS (E.G., VIA THE CHATBOT), AND PRESENT EXPLANATION

SECURED INTELLIGENT IDENTITY VERIFICATION THROUGH BLOCKCHAIN

FIELD

The present disclosure generally relates to distributed ledger and artificial intelligence (AI) technology, and more particularly relates to identity verification through distributed ledger and/or AI technology.

BACKGROUND

User authentication (e.g., determining if a person is who they claim to be) is important to many companies. For example, for a company managing retirement accounts, it is important to verify a user's identity when the user applies for a loan against the retirement account. However, current authentication systems have certain drawbacks.

The systems and methods disclosed herein provide solutions to these problems and may provide solutions to the ineffectiveness, insecurities, difficulties, inefficiencies, encumbrances, and/or other drawbacks of conventional techniques.

SUMMARY

In one aspect, a computer-implemented method for distributed ledger-based identity verification may be provided. The method may include: (1) receiving, via one or more processors, from a user device of a user, user-provided identity information; (2) scraping, via the one or more processors, from a website, data of the user; (3) adding, via the one or more processors, the scraped data of the user to a distributed ledger; and (4) attempting, via the one or more processors, to authenticate the user by inputting, into a smart contract stored on the distributed ledger: (i) the user-provided identity information, and (ii) the scraped data of the user added to the distributed ledger. The method may include additional, fewer, or alternate actions, including those discussed elsewhere herein.

In another aspect, a computer system for distributed ledger-based identity verification may be provided. For example, in one instance, the computer system may include one or more processors configured to: (1) receive, from a user device of a user, user-provided identity information; (2) scrape, from a website, data of the user; (3) add the scraped data of the user to a distributed ledger; and (4) attempt to authenticate the user by inputting, into a smart contract stored on the distributed ledger: (i) the user-provided identity information, and (ii) the scraped data of the user added to the distributed ledger. The computer system may include additional, less, or alternate functionality, including that discussed elsewhere herein.

In yet another aspect, a computer for distributed ledger-based identity verification may be provided. For example, the computer device may include: one or more processors; and/or one or more non-transitory memories coupled to the one or more processors. The one or more non-transitory memories including computer executable instructions stored therein that, when executed by the one or more processors, may cause the one or more processors to: (1) receive, from a user device of a user, user-provided identity information; (2) scrape, from a website, data of the user; (3) add the scraped data of the user to a distributed ledger; and (4) attempt to authenticate the user by inputting, into a smart contract stored on the distributed ledger: (i) the user-provided identity information, and (ii) the scraped data of the user added to the distributed ledger. The computer device may include additional, less, or alternate functionality, including that discussed elsewhere herein.

BRIEF DESCRIPTION OF THE DRAWINGS

Advantages will become more apparent to those skilled in the art from the following description of the preferred embodiments which have been shown and described by way of illustration. As will be realized, the present embodiments may be capable of other and different embodiments, and their details are capable of modification in various respects. Accordingly, the drawings and description are to be regarded as illustrative in nature and not as restrictive.

The figures described below depict various aspects of the applications, methods, and systems disclosed herein. It should be understood that each figure depicts an embodiment of a particular aspect of the disclosed applications, systems and methods, and that each of the figures is intended to accord with a possible embodiment thereof. Furthermore, wherever possible, the following description refers to the reference numerals included in the following figures, in which features depicted in multiple figures are designated with consistent reference numerals.

FIG. 5A depicts an example screen including an example explanation of why an authentication attempt was not authorized.

FIG. 5B depicts an example screen including an example explanation of why an authentication attempt was authorized.

FIG. 6 depicts an example computer-implemented method for user authentication using a distributed ledger and/or AI.

DETAILED DESCRIPTION

Example System

Figure 1:
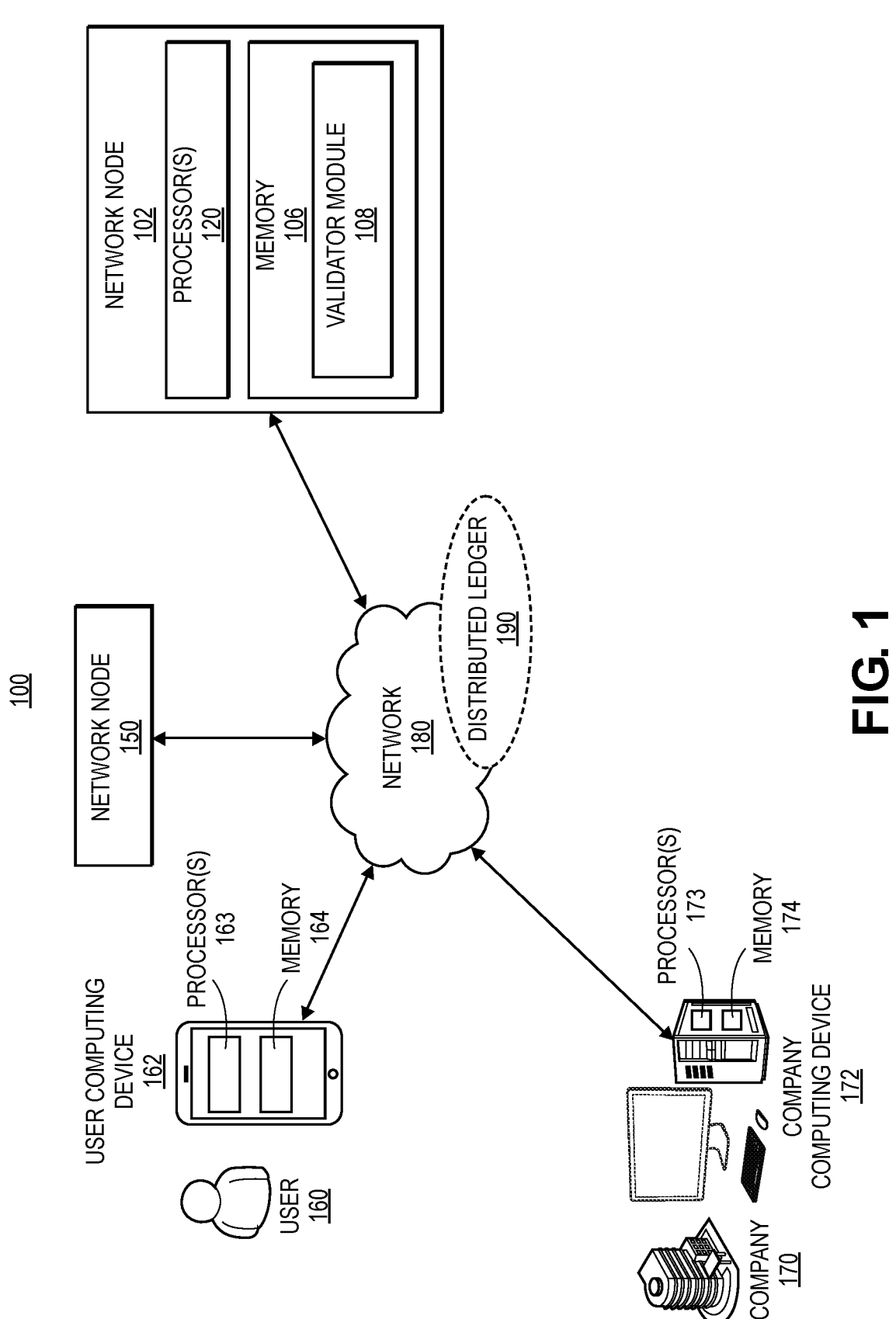
FIG. 1 depicts an example computer system for user authentication using a distributed ledger and/or artificial intelligence (AI).

FIG. 1 depicts an example computer system 100 for user authentication using a distributed ledger and/or artificial intelligence (AI). The example computer system 100 may include network nodes 102, 150, company computing device 172, user computing device 162, which may be communicatively connected through a network 180 as described below.

In one example, company 170 is a company that administers retirement programs. In this example, user 160 is a customer of the company 170 that has a retirement account with the company 170, and is attempting to be authenticated as part of the process for applying for a loan from the retirement account. As will become apparent from this disclosure, the techniques described herein improve the authentication process, for example, by leveraging a distributed ledger 190.

According to certain embodiments, the network nodes 102, 150 (which may maintain the distributed ledger 190) may be a combination of hardware and software components, also as described in more detail below with reference to FIGS. 8-10. The network nodes 102, 150 may each include a memory 106, one or more processors 120, such as a microcontroller or a microprocessor, and other components not shown in FIG. 1 (e.g., a random-access memory (RAM), and/or an input/output (I/O) circuit), all of which may be interconnected via an address/data bus.

The memory 106 and/or RAM may store various applications for execution by the one or more processors 120. For example, a user interface application may provide a user interface to the network node 102, which user interface may, for example, allow the system administrator to configure, troubleshoot, and/or test various aspects of the node's operation. The memory 106 may be tangible, non-transitory memory and may include any types of suitable memory modules, including RAM, read-only memory (ROM), flash memory, other types of persistent memory, etc. The memory 106 may store, for example, instructions executable on the processors 120 for a validator module 108.

The validator module 108 may validate changes to the blockchain (e.g., when a new transaction and/or block is created) according to a set of consensus rules. The consensus rules depend on the information being tracked by the blockchain and may include rules regarding the chain itself. For example, a consensus rule may include that the originator of a change supply a proof-of-identity such that only approved entities may originate changes to the chain. Consensus rules may include a mechanism to determine the order in which new blocks are added to the chain (e.g., through a proof-of-work system, proof-of-stake, etc.).

The validator module 108 may append distributed ledger data to the distributed ledger 190 if the distributed ledger data satisfies the consensus rules by generating a new block of validated transactions to include in the distributed ledger 190 and/or by broadcasting a block of transactions to other network nodes. Otherwise, the validator module 108 may disregard any distributed ledger data that does not satisfy the consensus rules, and the distributed ledger data is not propagated to other network nodes.

In another implementation, network nodes 102, 150 on the distributed ledger 190 are configured to maintain a state database and execute code in smart contracts deployed by network participants. A smart contract on the distributed ledger 190 may include a program for authenticating a user, for example, in accordance with the techniques discussed herein.

The company 170 may be any kind of company. For example, as mentioned above, the company 170 may be a company that manages retirement accounts. The company computing device 172 may include one or more processors 173 such as one or more microprocessors, controllers, and/or any other suitable type of processor. The company computing device 172 may further include a memory 174 (e.g., volatile memory, non-volatile memory) accessible by the one or more processors 173, (e.g., via a memory controller). The one or more processors 173 may interact with the memory 174 to obtain and execute, for example, computer-readable instructions stored in the memory 174. Additionally or alternatively, computer-readable instructions may be stored on one or more removable media (e.g., a compact disc, a digital versatile disc, removable flash memory, etc.) that may be coupled to the company computing device 172 to provide access to the computer-readable instructions stored thereon.

Furthermore, in some embodiments, the company computing device 172 itself may be a network node on the distributed ledger 190 (e.g., the memory 174 may include a validator module, etc.).

In one example, as mentioned above, the user 160 is a user that has a retirement account with the company 170. The user 160 may use the user computing device 162, which may include one or more processors 163 such as one or more microprocessors, controllers, and/or any other suitable type of processor. The user computing device 162 may further include a memory 164 (e.g., volatile memory, non-volatile memory) accessible by the one or more processors 163, (e.g., via a memory controller). The one or more processors 163 may interact with the memory 164 to obtain and execute, for example, computer-readable instructions stored in the memory 164. Additionally or alternatively, computer-readable instructions may be stored on one or more removable media (e.g., a compact disc, a digital versatile disc, removable flash memory, etc.) that may be coupled to the user computing device 162 to provide access to the computer-readable instructions stored thereon.

Furthermore, in some embodiments, the user computing device 162 itself may be a network node on the distributed ledger 190 (e.g., the memory 164 may include a validator module, etc.).

The network nodes 102, 150, user computing device 162, and/or the company computing device 172 may communicate with each other via the network 180. The network 180 may be a proprietary network, a secure public Internet, a virtual private network and/or some other type of network, such as dedicated access lines, plain ordinary telephone lines, satellite links, a wireless telephony network, combinations of these, etc. Where the network 180 comprises the Internet, data communication may take place over the network 180 via an Internet communication protocol.

Furthermore, although the example system 100 illustrates only certain number(s) of each of the components, any number of the example components are contemplated (e.g., any number of network nodes, user computing devices, company computing devices, etc.).

Example Architecture

Figure 2:
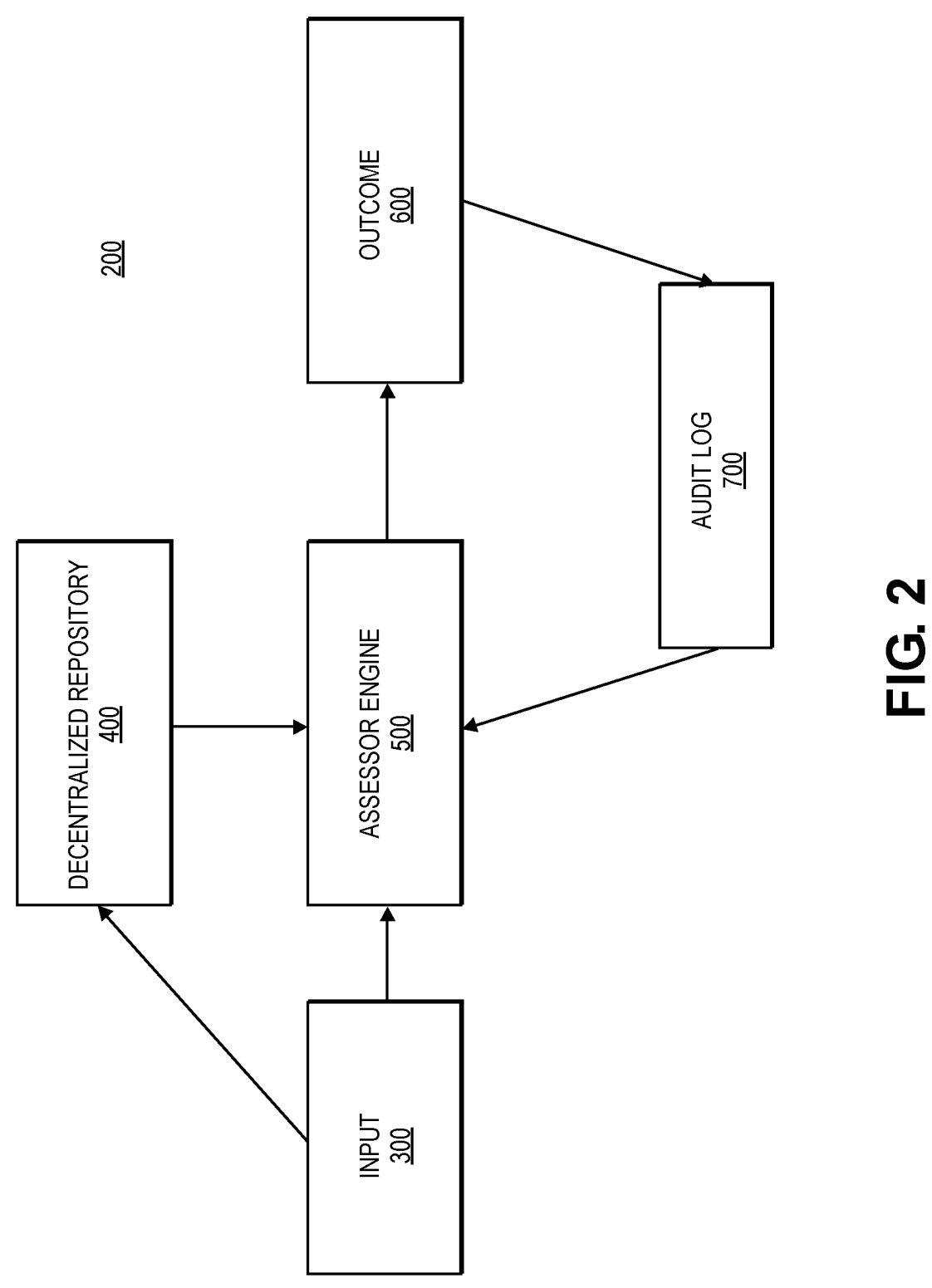
FIG. 2 depicts an example diagram for user authentication using a distributed ledger and/or AI.

FIG. 2 depicts an example diagram 200 for user authentication using a distributed ledger and/or AI.

Figure 3:
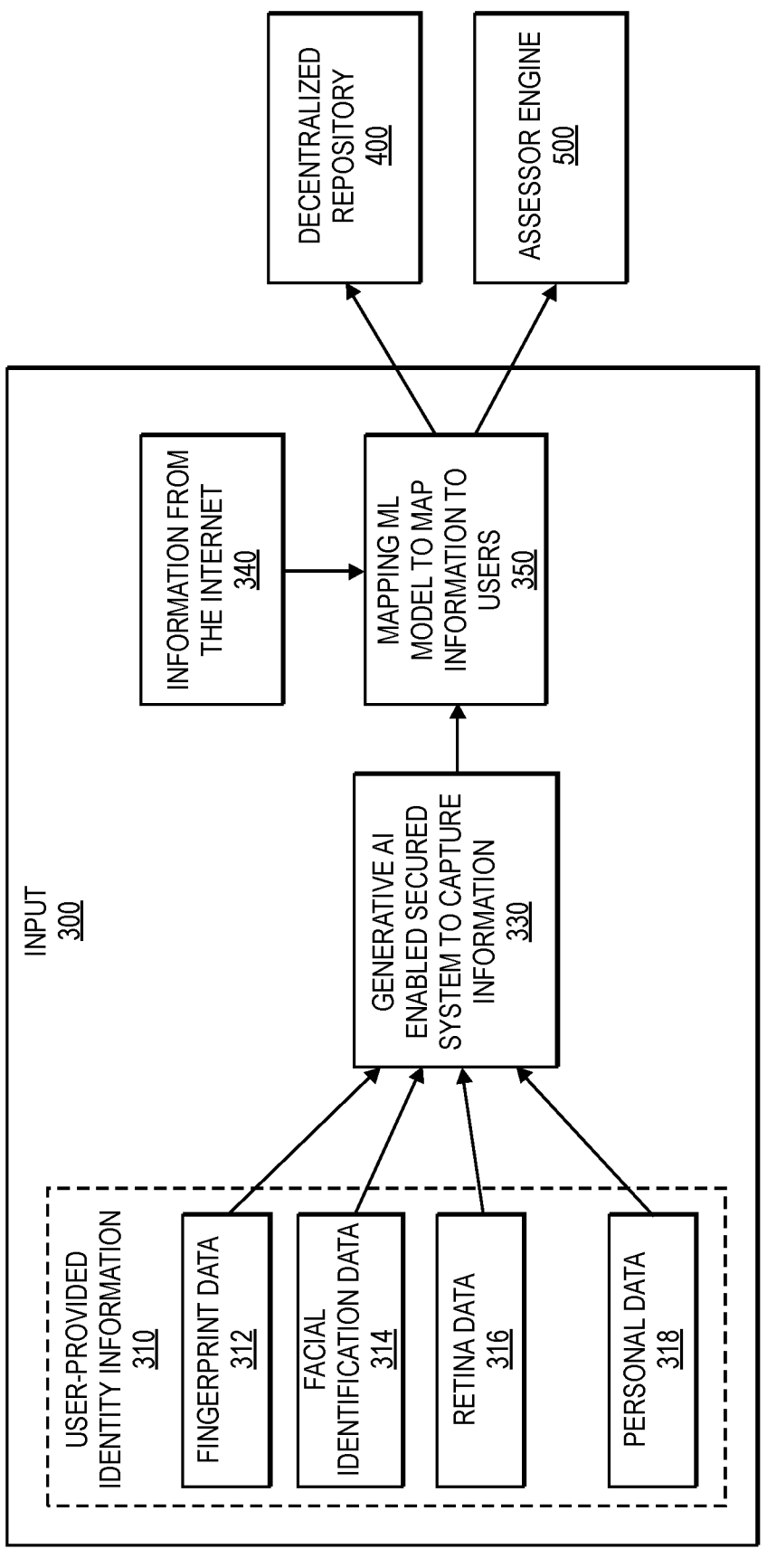
FIG. 3 depicts aspects of an input.

In some embodiments, the example diagram 200 may begin with input 300. FIG. 3 depicts aspects of the input 300. With reference thereto, some or all of the input 300 may be generated by the user device 162. For example, the user 160 may enter user-provided identity information 310 into the user computing device 162. The user-provided identity information 310 may include any suitable information (e.g., biometric data, etc.). Examples of the user-provided identity information 310 include fingerprint data 312 (e.g., the user device 162 includes or is connected to a fingerprint scanner; the user device 162 comprises a smartphone including a camera, and the user 160 takes a picture of her finger; the user device 162 uploads a picture of the user's 160 finger from another source; etc.); facial identification data 314 (e.g., an imagery data [e.g., image(s) or video(s)] of the user 160 taken by a camera of the user device 162; imagery data of the user 160 uploaded from another source; facial expression data; etc.); retina data 316 (e.g., retina scan data captured by the user input device 162, or uploaded from another source, etc.); or personal data 318 (e.g., the user's 160 name, address, social security number, driver's license number, username and/or password of a user profile, etc.). In some embodiments, the user-provided identity information 310 additionally or alternatively includes voice identification data (e.g., a recording of the user's 160 voice, etc.).

The user-provided identity information 310 may be sent to the generative AI enabled secured system to capture information 330, which may be stored and/or run on the company computing device 172 and/or distributed ledger 190. In some embodiments, the generative AI enabled secured system to capture information 330 may include a chatbot. For example, the chatbot may analyze the user-provided identity information 310 to determine additional information needed to authenticate the user 160, and then compose text to send to the user device 162 requesting the additional information.

The generative AI enabled secured system to capture information 330 may send its output to the mapping machine learning (ML) model to map information to users 350, which may also receive information from the internet 340. The information from the internet 340 may include any suitable information. Examples of the information from the internet 340 may include: imagery data, text data, fingerprint data, facial identification data, retina data, personal data, etc. The information from the internet 340 may be scraped from website(s). The information from the internet 340 may be scraped manually (e.g., human user conducts internet searches to find relevant information) and/or automatically (web crawlers gather the information).

The mapping ML model 350 may map users (e.g., user 160) to information from the internet 340. The mapping ML model 350 may map entire webpages (e.g., a social media page), and/or individual pieces of information (e.g., an image) to users. In one example, the mapping ML model may map a user to the user's social media page, thereby enabling the system to authenticate the user by comparing an image from the user's social media page with facial identification data 314 (e.g., an image uploaded by the user 160, etc.). The training of the mapping ML model 350 will be described elsewhere herein (e.g., with respect to FIG. 6).

The mapping ML model 350 may send its output to one or both of the decentralized repository 400 and/or the assessor engine 500. The decentralized repository 400 may be implemented on the distributed ledger 190 and/or the company computing device 172. The decentralized repository 400 may store any suitable information. Examples of the information stored by the decentralized repository 400 include: profiles of users; information scraped from the internet; outputs of the input 300; etc.

Figure 4:
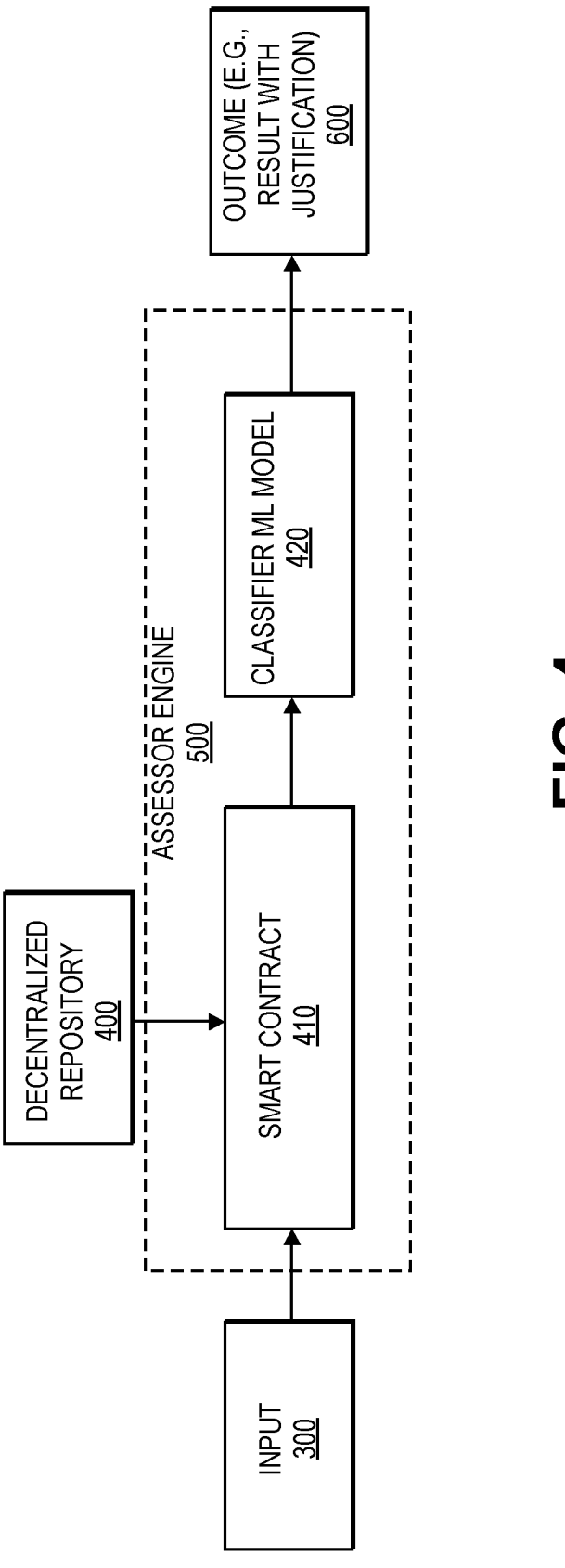
FIG. 4 depicts an example diagram including a smart contract outputting information to a classifier ML model.

In some embodiments, as illustrated in the example of FIG. 4, the assessor engine 500 may include smart contract 410 and classifier ML model 420. Although the example of FIG. 4 depicts one smart contract 410 and one classifier ML model 420, it should be appreciated that the assessor engine 500 may include any number of smart contracts 410 and/or classifier ML models 420.

The smart contract 410, which in some embodiments is a parameterized smart contract, may be stored on the distributed ledger 190. In some examples, the smart contract 410 comprises a program configured to run on the distributed ledger 190. The smart contract 410 may be configured to authenticate the user 160 based on: (i) the user-provided identity information 310, (ii) the data of the user 160 scraped from the internet (and optionally added to the distributed ledger 190), (iii) a user profile of the user 160 (or information from the user profile), and/or (iv) a profile of another user (or information from the profile of the other user).

In some examples, the smart contract 410 is configured to determine whether to authenticate the user 160 further based on parameters. For example, a parameter may indicate that if there is match between an image found on the internet and facial identification data 314, the user 160 should be authenticated. In some such examples, a second parameter may comprise a threshold indicating how close of a match (e.g., a comparison metric) between the image from the internet and the facial identification data 314 must be to be accepted as a match.

In another example, a parameter may indicate that there must be a particular number or more of (e.g., two or more, three or more, four or more, etc.) of the user-provided identity information 310 (e.g., the fingerprint data 312, the facial identification data 314, the retina data 316, the personal data, 318, etc.) and the data of the user 160 scraped from the internet (e.g., fingerprint data scraped from the internet, facial identification data scraped from the internet, retina data scraped from the internet, personal data scraped from the internet, etc.); and/or the user profile of the user 160 (or information from the user profile, such as fingerprint data from the user profile, facial identification data from the user profile, retina data from the user profile, personal data from the user profile, etc.). For example, the parameter may require for authentication that there be match between two or more of the user-provided identity information 310 and data from the user profile of the user 160 (e.g., a match between (1) driver's license numbers from the identity information 310 and the user profile; and (2) an image from facial identification data 314 and the data scraped from the internet).

In another example, a parameter may specify that there must be a match between all three of (i) user-provided identity information 310, (ii) data of the user 160 scraped from the internet; and (iii) the user profile of the user 160 (or information from the user profile).

In yet another example, a parameter may specify not to use particular data if it is to stale. For example, a parameter may specify not to use images from before a predetermined time period (e.g., 5 years, 10 years, 15 years, etc.).

The smart contract 410 may send its output (e.g., approval or disapproval of an attempted authentication) to the classifier ML model 420. The classifier ML model 420, in some examples, has two primary functions. First, the classifier ML model 420 may classify the authentication attempt. For example, authentication attempts may be classified (i) as authorized or not authorized, and/or (ii) on the basis of the authentication (e.g., fingerprint data 312 matched fingerprint data from the user profile, etc.). Classifications may be stored anywhere on the distributed ledger 190 (e.g., at the decentralized repository 400 and/or the audit log 700, etc.) and/or may be output as part of the outcome 600.

Second, the classifier ML model 420 may generate text explaining why or why not an authentication attempt was authorized or not authorized. To this end, the classifier ML model 420 may include a chatbot, which will be described elsewhere herein. Text may be output as part of the outcome 600. FIG. 5A depicts an example screen 500 (e.g., displayed on a display of the company computing device 172) including an example explanation 510 of why an authentication attempt was not authorized.

Returning now to FIG. 2, the outcome 600 may be sent to the audit log 700. The audit log 700 may store any suitable information (e.g., on the distributed ledger 190, etc.). Examples of the information stored on the audit log 700 include any information of the output 600. Additionally or alternatively, the information may include profiles of users. Such profiles may be useful for determining authentication, particularly when finding matches between the user-provided identity information 310 and a profile that does not correspond to the user 160. For example, a bad actor may take an image from the internet, and upload it as the facial identification data 314. However, information in the audit log 700 (e.g., an image) corresponding to another user may be determined (e.g., by the smart contract 410) to match the image uploaded by the bad actor; and therefore, the smart contract 410 may reject the authentication attempt by the bad actor. Advantageously, this improves system security, thereby improving technical functioning.

The audit log 700 may additionally or alternatively include information scraped from the internet. For example, the audit log 700 may include imagery data, text descriptions of users, fingerprint data, personal information of users, retina data, etc.

Example Methods

FIG. 6 illustrates a flow diagram representing an exemplary computer-implemented method or implementation 600 for user authentication using a distributed ledger and/or AI.

The example method 600 may begin at block 602 when the system trains the ML model to map information to users 350. That is, the ML model to map information to users 350 may be trained to map users (e.g., user 160) to information from the internet 340. The mapping ML model 350 may map entire webpages (e.g., a social media page), and/or individual pieces of information (e.g., an image) to users. In one example, the mapping ML model may map a user to the user's social media page, thereby enabling the system to authenticate the user by comparing an image from the user's social media page with facial identification data 314 (e.g., an image uploaded by the user 160).

The ML model to map information to users 350 may be trained by any suitable component (e.g., the one or more processors 173, the one or more processors 120, etc.). The ML model to map information to users 350 may be trained based upon historical information retrieved from the distributed ledger 190 or any other suitable source.

Broadly speaking, the historical information may include information scraped from the internet and/or information from user profiles. Based upon such historical information, the ML model to map information to users 350 may be trained to find correlations between features in information scraped from the internet and the information from user profiles, thereby ultimately training the ML model to map information to users 350 to determine matches between information scraped from the internet and user profiles.

More specifically, the ML model to map information to users 350 may be trained using the historical information of information scraped from the internet as inputs (e.g., also referred to as independent variables, or explanatory variables) and the information of historical user profiles as outputs (e.g., also referred to as a dependent variables, or response variables).

Examples of the historical information include websites and/or pieces of information from websites (e.g., imagery data or other facial identification data from websites, text from websites, fingerprint data from websites, retina data from websites, personal data from websites, etc.). The historical information may also include uniform resource locators (URLs) of websites, dates/times that the websites and/or data from the websites was gathered, etc.

Correspondingly, the historical information of user profiles may include any information from user profiles.

Examples of the historical information from user profiles include fingerprint data, imagery data or other facial identification data, retina data, personal data (e.g., name, username, password, social security number, driver's license number, birthday, email address, profile username, etc.), etc.

In some embodiments, the historical information is comprised in a table. For example, there may be a table with one column of the historical information scraped from user profiles, and another column with the corresponding historical user profiles.

At block 605, the system receives the user-provided identity information 310 (e.g., at the one or more processors 173, the one or more processors 120, etc.). Examples of the user-provided identity information 310 are discussed elsewhere herein.

At block 610, the system (e.g., via the one or more processors 173, the one or more processors 120, etc.) adds the user-provided identity information 310 to a profile of the user (e.g., a profile of the user 162 stored on the distributed ledger 190 at the decentralized repository 400 and/or the audit log 700). A date and/or time may also be added to the user profile indicating when the user-provided identity information 310 was added to the user profile.

At block 615, the system scrapes data (e.g., information from internet 340) of one or more users from website(s) (e.g., via the one or more processors 173, the one or more processors 120, etc.). The scraped data may be gathered manually (e.g., human user conducts internet searches to find relevant information) and/or automatically (web crawlers gather the information). Examples of the scraped data may include: imagery data, text data, fingerprint data, facial identification data, retina data, personal data, etc. In some embodiments, the data scraping is performed in response to receiving the user-provided identity information 310 (e.g., the one or more processors 173 receive a user-name and password of a profile for the user 160, and, in response, scrape the internet for data of the user profile).

At block 620, the system maps, via mapping ML model 350 (e.g., via the one or more processors 173, the one or more processors 120, etc.), the scraped data to users (e.g., to user profiles of the users). Along with the scraped data, the mapping ML model may take, as an input a URL of the website that scraped data was gathered from.

Additionally or alternatively to mapping via the ML model 350, a human may manually map the scraped data to a user profile (e.g., by entering, into the company computing device 172, the name of the user that it is desired that the scraped data be mapped to).

At bock 625, the system (e.g., via the one or more processors 173, the one or more processors 120, etc.) adds the scraped data to the distributed ledger 190. For example, the scraped data may be added to a user profile that was mapped to at block 620 (e.g., a profile of a user stored on the distributed ledger 190 at the decentralized repository 400 and/or the audit log 700).

At block 630, the system attempts (e.g., via the one or more processors 173, the one or more processors 120, etc.) to authenticate the user 160 by inputting, into a smart contract 410 stored on the distributed ledger 190, for example: (i) the user-provided identity information 310, (ii) the data of the user 160 scraped from the internet (and possibly added to the distributed ledger 190), (iii) a user profile of the user 160 (or information from the user profile), and/or (iv) a profile of another user (or information from the profile of the other user). The smart contract 410 may attempt to authenticate the user 160 based on the inputs and parameters of the smart contract 410.

In one example of a parameter, a parameter may indicate that if there is match between an image found on the internet, and facial identification data 314, the user should be authenticated. In some such examples, a second parameter may comprise a threshold indicating how close of a match (e.g., a comparison metric) between the image from the internet and the facial identification data must be to be accepted as a match.

In still another example, a parameter may specify that, for authentication, there must be a match between all three of (i) user-provided identity information 310, (ii) data of the user 160 scraped from the internet; and (iii) the user profile of the user 160 (or information from the user profile).

In yet another example, a parameter may specify not to use particular data if it is to stale. For example, a parameter may specify not to use images from before a predetermined time period (e.g., 5 years, 10 years, 15 years, etc.).

In yet another example, a parameter may specify that the user-provided identity information 310 must be compared to information from profiles of other users. For example, the smart contract 410 may compare an image from the facial identification data 314 to images from profiles of other users. If there is a match, the smart contract 410 may determine to reject the authentication attempt (e.g., the match to the profile of the other user is a strong indication that the user attempting to authenticate is not who they claim to be). Advantageously, in accordance with the techniques disclosed herein, the combination of scraping very large number of images (e.g., thousands, tens of thousands, hundreds of thousands, etc.), mapping the scraped images to user profiles, and then comparing the mapped images to the image from the facial identification data 314 greatly improves computer security, thereby improving technical functioning.

If the smart contract 410 determines to approve the authentication attempt, the method proceeds to block 635, and the user 160 is authenticated. At block 640, the system may generate an explanation of the approval of the authentication attempt (e.g., via a chatbot, e.g., of the classifier ML model 420). The explanation may be presented in any suitable form. For example, the explanation may be presented visually (e.g., displayed on a display of the company computing device 172), and/or audibly (e.g., via the company computing device 172). FIG. 5B depicts an example screen 550 (e.g., displayed on a display of the company computing device 172) including an example explanation 560 of why an authentication attempt was not authorized.

If, at decision block 630, the smart contract 410 denies the authentication attempt, the system (e.g., via the one or more processors 173, the one or more processors 120, etc.) may prompt the user 160 for additional information at block 645. For example, a chatbot of the generative AI enabled secured system to capture information 330 may analyze the user-provided identity information 310 to determine that the user 160 has not provided enough information and/or determine additional information needed to authenticate the user 160; the chatbot may then compose text to send to the user device 162 requesting the additional information. For instance, the chatbot may determine that a username and password to log into a profile have been provided, but additional information, such as fingerprint data, facial identification data, retina data, or other personal data must be provided by the user 160 to authenticate the user 160; and the chatbot many then compose text requesting that the particular additional information that is required.

Figure 7:
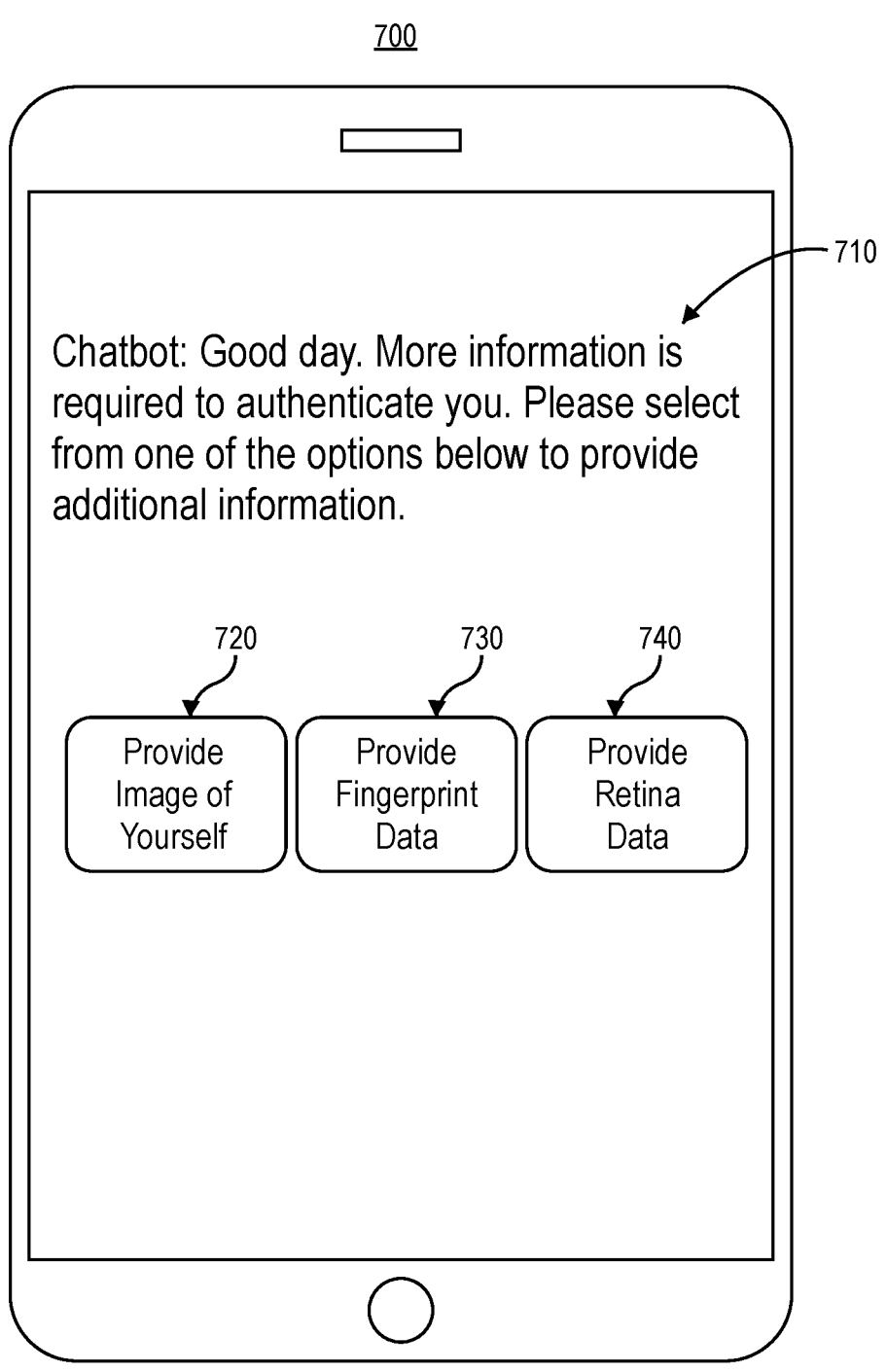
FIG. 7 depicts an example screen including text composed by the chatbot requesting additional information.

The composed text may be presented in any suitable form. For example, the composed text may be presented visually (e.g., displayed on a display of the company computing device 172), and/or audibly (e.g., via the company computing device 172). FIG. 7 depicts an example screen 700 (e.g., displayed on a display of the user computing device 162) including text composed by the chatbot requesting additional information. In the illustrated example, the user 162 may provide any of an image of himself, fingerprint data, and/or retina data (e.g., via buttons 720, 730, 740).

It should be understood that not all blocks and/or events of the exemplary signal diagrams and/or flowcharts are required to be performed. Moreover, the exemplary signal diagrams and/or flowcharts are not mutually exclusive (e.g., block(s)/events from each example signal diagram and/or flowchart may be performed in any other signal diagram and/or flowchart). The exemplary signal diagrams and/or flowcharts may include additional, less, or alternate functionality, including that discussed elsewhere herein.

Example Distributed Ledgers for User Authentication

Figure 8:
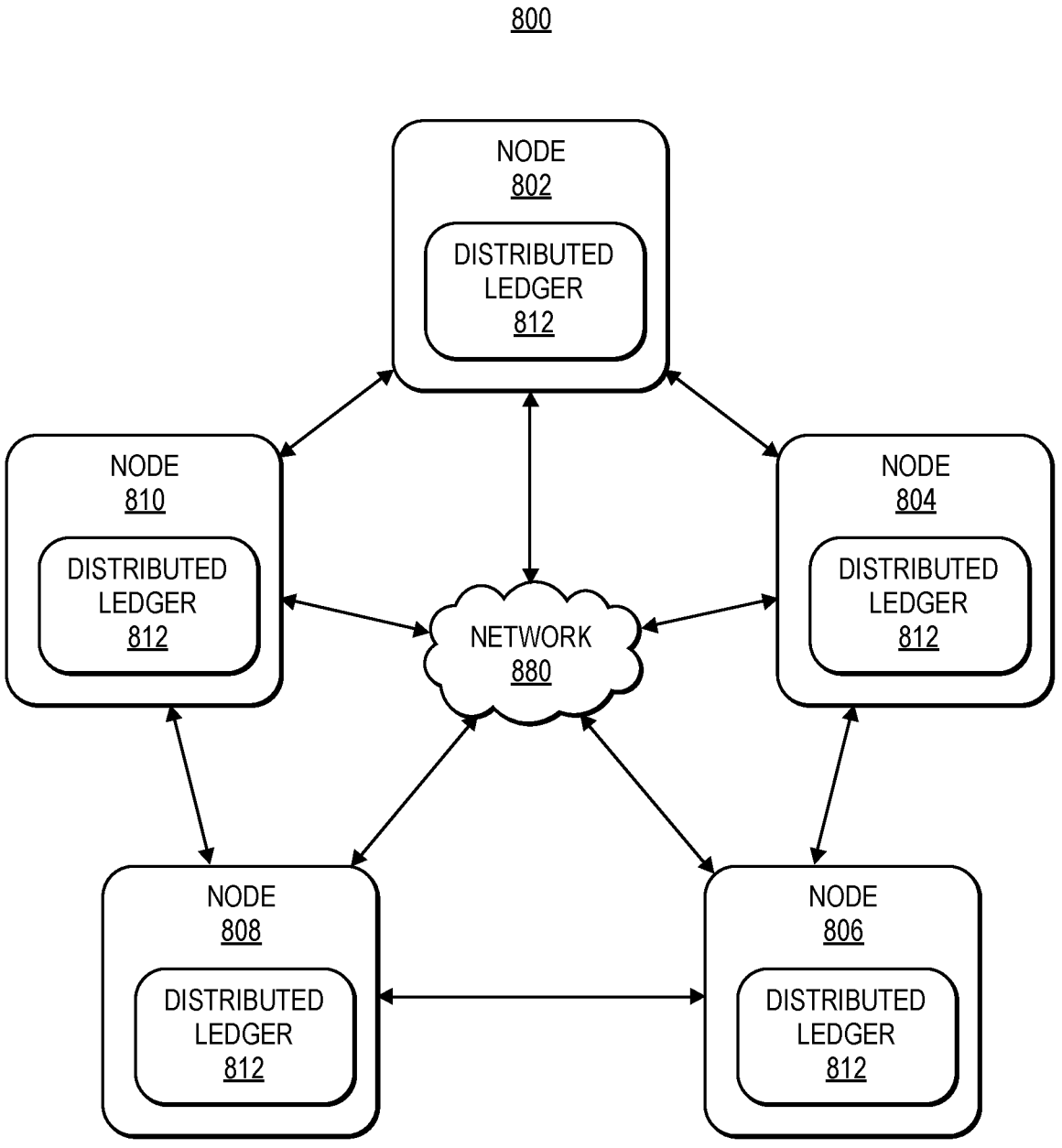
FIG. 8 illustrates example network nodes and an example distributed ledger.

FIG. 8 depicts an exemplary distributed ledger system 800 for user authentication (e.g., distributed ledger 190). The system 800 may include a distributed ledger 812 (e.g., having one or more distributed ledger layers) and a plurality of nodes 802, 804, 806, 808, and 810 (e.g., each similar to node 102 and/or 150 of FIG. 1, etc.). Each node maintains a copy of the distributed ledger 812. As changes are made to the distributed ledger 812, each node receives the change via the network 880 and updates its respective copy of the distributed ledger 812. A consensus mechanism may be used by the nodes 802-810 in the distributed ledger system 800 to decide whether it is appropriate to make received changes to the distributed ledger 812 or to a particular layer of the distributed ledger 812.

Each node in the system therefore has its own copy of the distributed ledger 812, which is identical to every other copy of the distributed ledger 812 stored by the other nodes. The distributed ledger system 800 may be more robust than a central authority database system because of the distributed ledger's decentralized nature. As such, there is no single point of failure on the distributed ledger system 800 as there would be in a centralized system.

Figure 9:
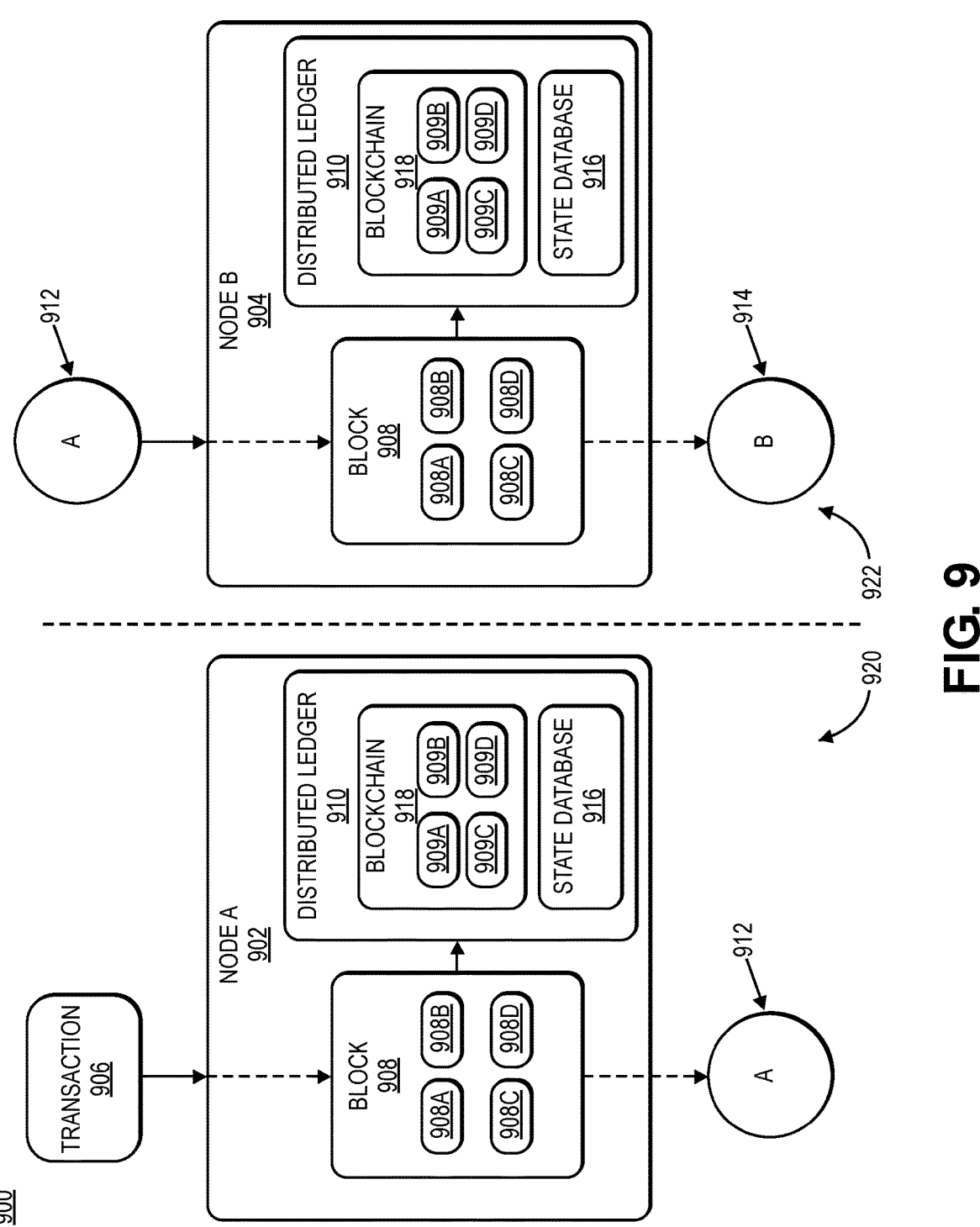
FIG. 9 depicts exemplary network nodes and an exemplary transaction flow on a distributed ledger network for user authentication.

FIG. 9 depicts exemplary network nodes and an exemplary transaction flow 900 on a distributed ledger network for user authentication (e.g., distributed ledger 190). FIG. 9 includes two time frames 920 and 922 represented by the left and right sides of the dotted line, respectively, Node A 902 (e.g., node 102) and Node B 904 (e.g., node 150), a set of transactions 908A-908D, a set of blocks of transactions 909A-909D, a distributed ledger 910, and a blockchain 918.

The block propagation flow 900 may begin with Node A 902 receiving transaction 906 at time 920. When Node A 902 confirms that transaction 906 is valid, Node A 902 may add the transaction to a newly generated block 908. As part of adding the transaction 906 to block 908, Node A 902 may solve a cryptographic puzzle and include the solution in the newly generated block 908 as proof of the work done to generate the block 908. Alternatively, a proof of stake algorithm may be used to generate the block 908, whereby Node A 902 "stakes" an amount of a digital token used on the network, however, the network itself determines the node that will mint the new block. In another implementation, a proof of authority (PoA) algorithm may be used to generate the block 908, where transactions and blocks are validated by approved accounts, known as validators which run software allowing them to record transactions in the distributed ledger.

In other embodiments, the transaction 906 may be added to a pool of transactions until a sufficient number of transactions in the pool exist to form a block or distributed ledger entry. Node A 902 may transmit the newly created distributed ledger entry 908 to the network at time 912. Before or after propagating the distributed ledger entry 908, Node A 902 may add the distributed ledger entry 908 to its copy of the blockchain 918.

While proof of work, proof of stake, and proof of authority are described herein as consensus algorithms for selecting a node to mint a new block, these are merely a few example consensus algorithms and are not intended to be limiting. Additional consensus algorithms may be utilized, such as delegated proof of stake where nodes elect a subset of nodes referred to as delegates to perform validation, and the delegates take turns minting new blocks. Consensus algorithms may also include proof of weight, Byzantine fault tolerance, tangle consensus algorithms, block lattice consensus algorithms, etc. Additionally, quorum slices may be selected where a quorum is a set of nodes that participate in the consensus protocol and a quorum slice is its subset that helps a node in its agreement process. Individual trust decisions may be made by participants in the distributed ledger network to construct a quorum slice. Still further, security circles may be identified which are closed groups of network participants who together can form a quorum to reach a consensus on a transaction and to make further trust decisions.

In any event, the transactions 909A-909D may include updates to a state database 916. The state database 916 may contain current values of variables created by smart contracts deployed on the blockchain 918. Validated distributed ledger entries, such as distributed ledger entry 908, may include transactions effecting state variables in state database 916. At time 922, Node B 904 may receive the newly created distributed ledger entry 908 via the network at 912. Node B 904 may verify that the distributed ledger entry 908 is valid by checking the solution to the cryptographic puzzle provided in the distributed ledger entry 908. If the solution is accurate, then Node B 904 may add the distributed ledger entry 908 to its blockchain 918 and make any updates to the state database 916 as rejected by the transactions in distributed ledger entry 908. Node B 904 may then transmit the distributed ledger entry 908 to the rest of the network at time 914.

Figure 10:
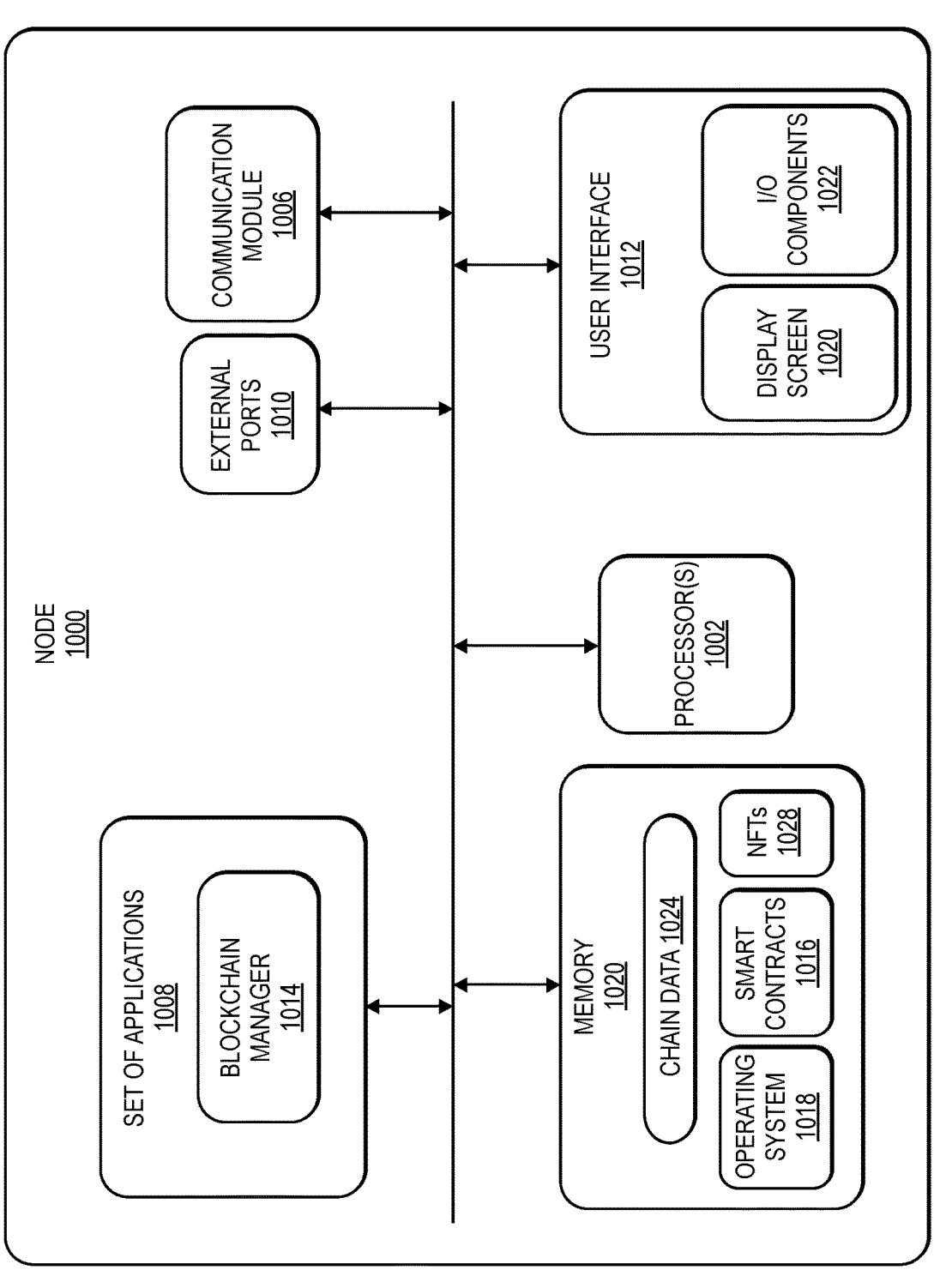
FIG. 10 depicts exemplary components of a network node on a distributed ledger network for user authentication.

FIG. 10 depicts exemplary components of a network node 1000 on a distributed ledger network for user authentication (e.g., distributed ledger 190). The network node 1000 may be similar to the network nodes 102, 150 described above with reference to FIG. 1. Network node 1000 may include at least one processor 1002, memory 1004, a communication module 1006 such as a transceiver, a set of applications 1008, external ports 1010, a blockchain manager 1014, smart contracts 1016, NFTs 1028, an operating system 1018, user interface 1012, display screen 1020, and/or I/O components 1022. In some embodiments, the network node 1000 may generate a new block of transactions, or may broadcast transactions to other network nodes via the communication module 1006 by using the blockchain manager 1014. Similarly, the network node 1000 may use the blockchain manager 1014 in conjunction with the NFTs 1028 and/or the smart contracts 1016 stored in the memory 1004 to provide the functionality disclosed herein. The memory 1004 may further include chain data 1024 including, for example, a state database of the blockchain for storing states of smart contracts deployed thereon.

In other embodiments, the smart contracts 1016 operate independent of the blockchain manager 1014 or other applications. In some embodiments, the network node 1000 does not have a blockchain manager 1014, NFTs 1028, or smart contracts 1016 stored at the network node. In some embodiments, the network node 1000 may have additional or fewer components than described.

Example Training of an Example Chabot

A company may use chatbot, such as the chatbot of the classifier ML model 420 and/or the generative AI enabled secured system to capture information 330, to, inter alia, provide tailored, conversational-like services (e.g., explaining why an authentication attempt was approved or rejected; requesting more information from the user 160; answering questions, such as questions about retirement plans, etc.). The chatbot may be capable of understanding requests, providing relevant information, escalating issues. Additionally, the chatbot may generate data from interactions which the enterprise may use to personalize future support and/or improve the chatbot's functionality, e.g., when retraining and/or fine-tuning the chatbot. Moreover, although the following discussion may refer to an ML chatbot or an ML model, it should be understood that it applies equally to an AI chatbot or an AI model.

The chatbot may be trained by any suitable component (e.g., the one or more processors 173, the one or more processors 120, etc.) using large training datasets of text which may provide sophisticated capability for natural-language tasks, such as answering questions and/or holding conversations. The chatbot may include a general-purpose pretrained LLM which, when provided with a starting set of words (prompt) as an input, may attempt to provide an output (response) of the most likely set of words that follow from the input. In some examples, the input prompt includes an automatic request for: an explanation of why an authentication succeeded (e.g., following blocks 630 and/or 635); an explanation of why an authentication failed (e.g., following blocks 630 and/or 645); and/or a request that to provide additional information (e.g., in response to a failed authentication at block 630).

In one aspect, the prompt may be provided to, and/or the response received from, the chatbot and/or any other ML model, via a user interface of the company computing device 172, a user interface of the customer computing device 162, etc. This may include a user interface device operably connected to the server via an I/O module. Exemplary user interface devices may include a touchscreen, a keyboard, a mouse, a microphone, a speaker, a display, and/or any other suitable user interface devices.

Multi-turn (i.e., back-and-forth) conversations may require LLMs to maintain context and coherence across multiple user utterances, which may require the chatbot to keep track of an entire conversation history as well as the current state of the conversation. The chatbot may rely on various techniques to engage in conversations with users, which may include the use of short-term and long-term memory. Short-term memory may temporarily store information (e.g., in the memory 174) that may be required for immediate use and may keep track of the current state of the conversation and/or to understand the user's latest input in order to generate an appropriate response. Long-term memory may include persistent storage of information (e.g., memory 174, etc.) which may be accessed over an extended period of time. The long-term memory may be used by the chatbot to store information about the user (e.g., preferences, chat history, etc.) and may be useful for improving an overall user experience by enabling the chatbot to personalize and/or provide more informed responses.

In some embodiments, the system and methods to generate and/or train an ML chatbot model which may be used in the chatbot, may include three steps: (1) a supervised fine-tuning (SFT) step where a pretrained language model (e.g., an LLM) may be fine-tuned on a relatively small amount of demonstration data curated by human labelers to learn a supervised policy (SFT ML model) which may generate responses/outputs from a selected list of prompts/inputs. The SFT ML model may represent a cursory model for what may be later developed and/or configured as the ML chatbot model; (2) a reward model step where human labelers may rank numerous SFT ML model responses to evaluate the responses which best mimic preferred human responses, thereby generating comparison data. The reward model may be trained on the comparison data; and/or (3) a policy optimization step in which the reward model may further fine-tune and improve the SFT ML model. The outcome of this step may be the ML chatbot model using an optimized policy. In one aspect, step one may take place only once, while steps two and three may be iterated continuously, e.g., more comparison data is collected on the current ML chatbot model, which may be used to optimize/update the reward model and/or further optimize/update the policy.

Supervised Fine-Tuning ML Model

Figure 11:
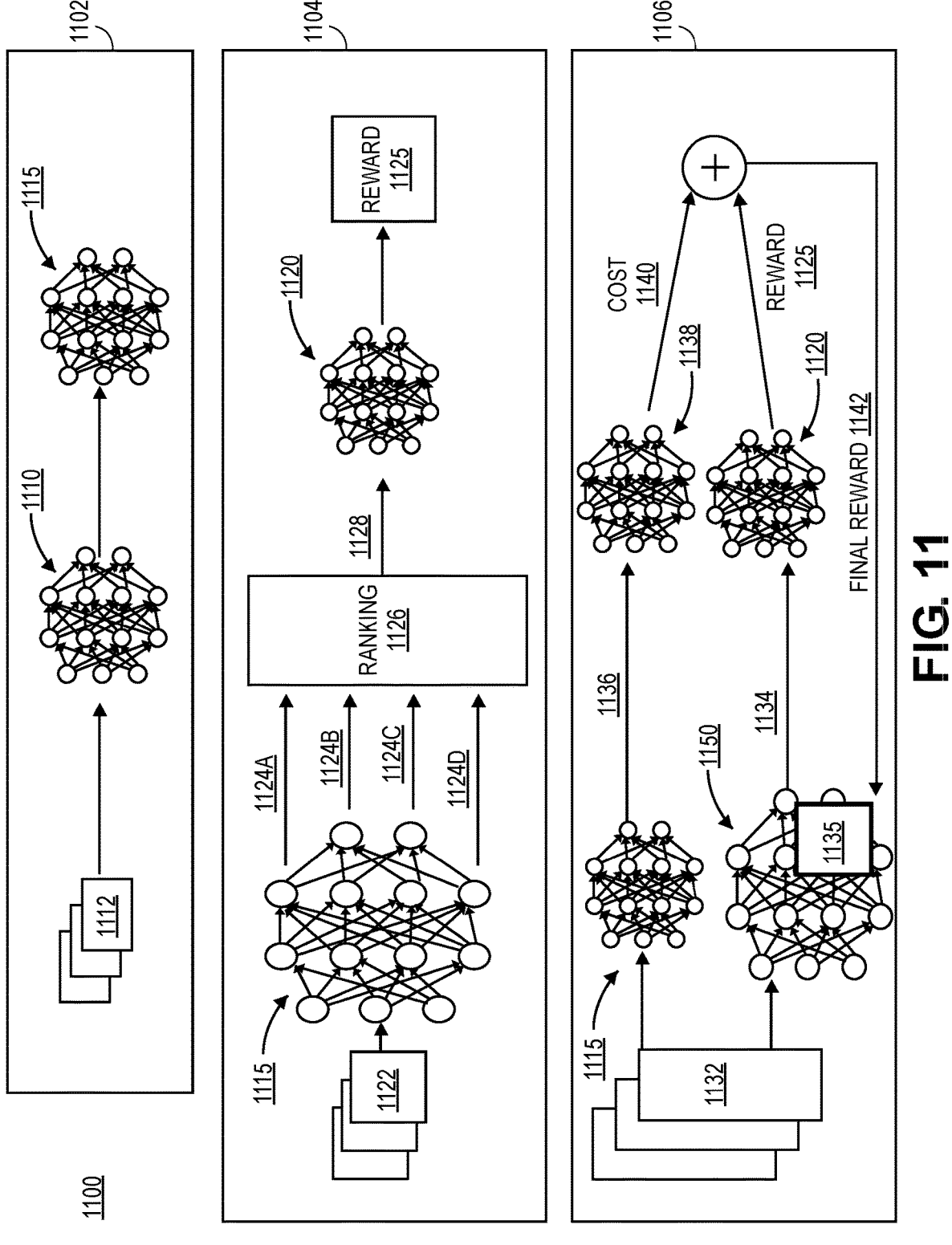
FIG. 11 depicts an example combined block and logic diagram for example training of an example chatbot.

As an initial matter, although the discussion with respect to FIG. 11 refers to ML model 1150, it should be understood that 1150 may refer equally to an AI and/or ML algorithm and/or model.

FIG. 11 depicts a combined block and logic diagram 1100 for training an ML chatbot model, in which the techniques described herein may be implemented, according to some embodiments. It should be understood that FIG. 11 may apply to training any chatbot described herein. In addition, the chatbot may be trained in accordance with any of the other techniques described herein; and the training of chatbot should not be considered restricted to the teachings of FIG. 11.

Some of the blocks in FIG. 11 may represent hardware and/or software components, other blocks may represent data structures or memory storing these data structures, registers, or state variables (e.g., 1112), and other blocks may represent output data (e.g., 1125). Input and/or output signals may be represented by arrows labeled with corresponding signal names and/or other identifiers. The methods and systems may include one or more blocks 1102, 1104, 1106, which will be described in further detail below.

In one aspect, at block 1102, a pretrained language model 1110 may be fine-tuned. The pretrained language model 1110 may be obtained at block 1102 and be stored in a memory, such as memory 174. The pretrained language model 1110 may be loaded into an ML training module at block 1102 for retraining/fine-tuning. A supervised training dataset 1112 may be used to fine-tune the pretrained language model 1110 wherein each data input prompt to the pretrained language model 1110 may have a known output response for the pretrained language model 1110 to learn from. The supervised training dataset 1112 may be stored in a memory at block 1102, e.g., the memory 174. In one aspect, the data labelers may create the supervised training dataset 1112 prompts and appropriate responses. The pre-trained language model 1110 may be fine-tuned using the supervised training dataset 1112 resulting in the SFT ML model 1115 which may provide appropriate responses to user prompts once trained. The trained SFT ML model 1115 may be stored in a memory, such as the memory 174.

In one aspect, the supervised training dataset 1112 may include prompts and responses (e.g., questions and answers, etc.) which may be relevant to user 160. Examples of prompts and responses include automatically generated prompts requesting explanations of authentication passes and failures, and the corresponding responses explaining the reasons for the passes or failures. Further examples of prompts and responses include automatically generated prompts prompting for requests for a user to provide additional information, and the corresponding requests. Still further examples of prompts and responses include user questions, and corresponding answers. For instance, a user may ask "what do I need to provide to be authenticated?" Example responses from the trained SFT ML model 1115 may include "please provide your driver's license number." The responses may include one or both of an answer to the question and/or options to enter information (e.g., buttons 720, 730, 740, etc.). In some embodiments, the supervised training dataset 1112 may include: historical data from historical conversations, including historical questions and answers; historical outputs from generative AI enabled secured system to capture information 330; historical outputs from information from the internet 340; historical outputs from the smart contract 410; etc.

Training the Reward Model

In one aspect, training the ML chatbot model 1150 may include, at block 1104, training a reward model 1120 to provide, as an output, a scaler value/reward 1125. The reward model 1120 may be required to leverage Reinforcement Learning with Human Feedback (RLHF) in which a model (e.g., ML chatbot model 1150) learns to produce outputs which maximize its reward 1125, and in doing so may provide responses which are better aligned to user prompts.

Training the reward model 1120 may include, at block 1104, providing a single prompt 1122 to the SFT ML model 1115 as an input. The input prompt 1122 may be provided via an input device (e.g., a keyboard) of the company computing device 172. The prompt 1122 may be previously unknown to the SFT ML model 1115, e.g., the labelers may generate new prompt data, the prompt 1122 may include testing data stored on memory 174, and/or any other suitable prompt data. The SFT ML model 1115 may generate multiple, different output responses 1124A, 1124B, 1124C, 1124D to the single prompt 1122. At block 1104, the company computing device 172 may output the responses 1124A, 1124B, 1124C, 1124D via any suitable technique, such as outputting via a display (e.g., as text responses), a speaker (e.g., as audio/voice responses), etc., for review by the data labelers.

The data labelers may provide feedback (e.g., via the company computing device 172, etc.) on the responses 1124A, 1124B, 1124C, 1124D when ranking 1126 them from best to worst based upon the prompt-response pairs. The data labelers may rank 1126 the responses 1124A, 1124B, 1124C, 1124D by labeling the associated data. The ranked prompt-response pairs 1128 may be used to train the reward model 1120. In one aspect, the company computing device 172 may load the reward model 1120 and train the reward model 1120 using the ranked response pairs 1128 as input. The reward model 1120 may provide as an output the scalar reward 1125.

In one aspect, the scalar reward 1125 may include a value numerically representing a human preference for the best and/or most expected response to a prompt, i.e., a higher scaler reward value may indicate the user is more likely to prefer that response, and a lower scalar reward may indicate that the user is less likely to prefer that response. For example, inputting the "winning" prompt-response (i.e., input-output) pair data to the reward model 1120 may generate a winning reward. Inputting a "losing" prompt-response pair data to the same reward model 1120 may generate a losing reward. The reward model 1120 and/or scalar reward 1136 may be updated based upon labelers ranking 1126 additional prompt-response pairs generated in response to additional prompts 1122.

In one example, a data labeler may provide to the SFT ML model 1115 as an input prompt 1122, "Describe the sky." The input may be provided by the labeler (e.g., via the company computing device 172, etc.) to the company computing device 172 and/or distributed ledger 190 running the chatbot utilizing the SFT ML model 1115. The SFT ML model 1115 may provide as output responses to the labeler (e.g., via their respective devices): (i) "the sky is above" 1124A; (ii) "the sky includes the atmosphere and may be considered a place between the ground and outer space" 1124B; and (iii) "the sky is heavenly" 1124C. The data labeler may rank 1126, via labeling the prompt-response pairs, prompt-response pair 1122/1124B as the most preferred answer; prompt-response pair 1122/1124A as a less preferred answer; and prompt-response 1122/1124C as the least preferred answer. The labeler may rank 1126 the prompt-response pair data in any suitable manner. The ranked prompt-response pairs 1128 may be provided to the reward model 1120 to generate the scalar reward 1125. It should be appreciated that this facilitates training the chatbot to compose explanations of why authentication attempts were approved or rejected; and/or requests for additional information.

While the reward model 1120 may provide the scalar reward 1125 as an output, the reward model 1120 may not generate a response (e.g., text). Rather, the scalar reward 1125 may be used by a version of the SFT ML model 1115 to generate more accurate responses to prompts, i.e., the SFT model 1115 may generate the response such as text to the prompt, and the reward model 1120 may receive the response to generate a scalar reward 1125 of how well humans perceive it. Reinforcement learning may optimize the SFT model 1115 with respect to the reward model 1120 which may realize the configured ML chatbot model 1150.

RLHF to Train the ML Chatbot Model

In one aspect, the company computing device 172 may train the ML chatbot model 1150 (e.g., via the one or more processors 172, the one or more processors 120, etc.) to generate a response 1134 to a random, new and/or previously unknown user prompt 1132. To generate the response 1134, the ML chatbot model 1150 may use a policy 1135 (e.g., algorithm) which it learns during training of the reward model 1120, and in doing so may advance from the SFT model 1115 to the ML chatbot model 1150. The policy 1135 may represent a strategy that the ML chatbot model 1150 learns to maximize its reward 1125. As discussed herein, based upon prompt-response pairs, a human labeler may continuously provide feedback to assist in determining how well the ML chatbot's 1150 responses match expected responses to determine rewards 1125. The rewards 1125 may feed back into the ML chatbot model 1150 to evolve the policy 1135. Thus, the policy 1135 may adjust the parameters of the ML chatbot model 1150 based upon the rewards 1125 it receives for generating good responses. The policy 1135 may update as the ML chatbot model 1150 provides responses 1134 to additional prompts 1132.

In one aspect, the response 1134 of the ML chatbot model 1150 using the policy 1135 based upon the reward 1125 may be compared using a cost function 1138 to the SFT ML model 1115 (which may not use a policy) response 1136 of the same prompt 1132. At block 1106 a cost 1140 may be computed based upon the cost function 1138 of the responses 1134, 1136. The cost 1140 may reduce the distance between the responses 1134, 1136, i.e., a statistical distance measuring how one probability distribution is different from a second, in one aspect the response 1134 of the ML chatbot model 1150 versus the response 1136 of the SFT model 1115. Using the cost 1140 to reduce the distance between the responses 1134, 1136 may avoid a server over-optimizing the reward model 1120 and deviating too drastically from the human-intended/preferred response. Without the cost 1140, the ML chatbot model 1150 optimizations may result in generating responses 1134 which are unreasonable but may still result in the reward model 1120 outputting a high reward 1125.

In one aspect, the responses 1134 of the ML chatbot model 1150 using the current policy 1135 may be passed to the rewards model 1120, which may return the scalar reward or discount 1125. The ML chatbot model 1150 response 1134 may be compared via cost function 1138 to the SFT ML model 1115 response 1136 to compute the cost 1140. A final reward 1142 may be generated which may include the scalar reward 1125 offset and/or restricted by the cost 1140. The final reward or discount 1142 may be provided to the ML chatbot model 1150 and may update the policy 1135, which in turn may improve the functionality of the ML chatbot model 1150.

To optimize the ML chatbot model 1150 over time, RLHF via the human labeler feedback may continue ranking 1126 responses of the ML chatbot model 1150 versus outputs of earlier/other versions of the SFT ML model 1115, i.e., providing positive or negative rewards 1125. The RLHF may allow the training process to continue iteratively updating the reward model 1120 and/or the policy 1135. As a result, the ML chatbot model 1150 may be retrained and/or fine-tuned based upon the human feedback via the RLHF process, and throughout continuing conversations may become increasingly efficient.

Although multiple blocks 1102, 1104, 1106 are depicted in the exemplary block and logic diagram 1100, each providing one of the three steps of the overall ML chatbot model 1150 training, fewer and/or additional blocks may be utilized and/or may provide the one or more steps of the chatbot training. In some variations, each block 1102, 1104, 1106 represents one or more servers (e.g., each server performs a different training stage, etc.).

OTHER MATTERS

Although the text herein sets forth a detailed description of numerous different embodiments, it should be understood that the legal scope of the invention is defined by the words of the claims set forth at the end of this patent. The detailed description is to be construed as exemplary only and does not describe every possible embodiment, as describing every possible embodiment would be impractical, if not impossible. One could implement numerous alternate embodiments, using either current technology or technology developed after the filing date of this patent, which would still fall within the scope of the claims.

It should also be understood that, unless a term is expressly defined in this patent using the sentence "As used herein, the term '_____' is hereby defined to mean . . . " or a similar sentence, there is no intent to limit the meaning of that term, either expressly or by implication, beyond its plain or ordinary meaning, and such term should not be interpreted to be limited in scope based upon any statement made in any section of this patent (other than the language of the claims). To the extent that any term recited in the claims at the end of this disclosure is referred to in this disclosure in a manner consistent with a single meaning, that is done for sake of clarity only so as to not confuse the reader, and it is not intended that such claim term be limited, by implication or otherwise, to that single meaning.

Throughout this specification, plural instances may implement components, operations, or structures described as a single instance. Although individual operations of one or more methods are illustrated and described as separate operations, one or more of the individual operations may be performed concurrently, and nothing requires that the operations be performed in the order illustrated. Structures and functionality presented as separate components in example configurations may be implemented as a combined structure or component. Similarly, structures and functionality presented as a single component may be implemented as separate components. These and other variations, modifications, additions, and improvements fall within the scope of the subject matter herein.

Additionally, certain embodiments are described herein as including logic or a number of routines, subroutines, applications, or instructions. These may constitute either software (code embodied on a non-transitory, tangible machine-readable medium) or hardware. In hardware, the routines, etc., are tangible units capable of performing certain operations and may be configured or arranged in a certain manner. In example embodiments, one or more computer systems (e.g., a standalone, client or server computer system) or one or more hardware modules of a computer system (e.g., a processor or a group of processors) may be configured by software (e.g., an application or application portion) as a hardware module that operates to perform certain operations as described herein.

In various embodiments, a hardware module may be implemented mechanically or electronically. For example, a hardware module may comprise dedicated circuitry or logic that is permanently configured (e.g., as a special-purpose processor, such as a field programmable gate array (FPGA) or an application-specific integrated circuit (ASIC) to perform certain operations). A hardware module may also comprise programmable logic or circuitry (e.g., as encompassed within a general-purpose processor or other programmable processor) that is temporarily configured by software to perform certain operations. It will be appreciated that the decision to implement a hardware module mechanically, in dedicated and permanently configured circuitry, or in temporarily configured circuitry (e.g., configured by software) may be driven by cost and time considerations.

Accordingly, the term "hardware module" should be understood to encompass a tangible entity, be that an entity that is physically constructed, permanently configured (e.g., hardwired), or temporarily configured (e.g., programmed) to operate in a certain manner or to perform certain operations described herein. Considering embodiments in which hardware modules are temporarily configured (e.g., programmed), each of the hardware modules need not be configured or instantiated at any one instance in time. For example, where the hardware modules comprise a general-purpose processor configured using software, the general-purpose processor may be configured as respective different hardware modules at different times. Software may accordingly configure a processor, for example, to constitute a particular hardware module at one instance of time and to constitute a different hardware module at a different instance of time.

Hardware modules can provide information to, and receive information from, other hardware modules. Accordingly, the described hardware modules may be regarded as being communicatively coupled. Where multiple of such hardware modules exist contemporaneously, communications may be achieved through signal transmission (e.g., over appropriate circuits and buses) that connect the hardware modules. In embodiments in which multiple hardware modules are configured or instantiated at different times, communications between such hardware modules may be achieved, for example, through the storage and retrieval of information in memory structures to which the multiple hardware modules have access. For example, one hardware module may perform an operation and store the output of that operation in a memory device to which it is communicatively coupled. A further hardware module may then, at a later time, access the memory device to retrieve and process the stored output. Hardware modules may also initiate communications with input or output devices, and can operate on a resource (e.g., a collection of information).

The various operations of example methods described herein may be performed, at least partially, by one or more processors that are temporarily configured (e.g., by software) or permanently configured to perform the relevant operations. Whether temporarily or permanently configured, such processors may constitute processor-implemented modules that operate to perform one or more operations or functions. The modules referred to herein may, in some example embodiments, comprise processor-implemented modules.

Similarly, the methods or routines described herein may be at least partially processor-implemented. For example, at least some of the operations of a method may be performed by one or more processors or processor-implemented hardware modules. The performance of certain of the operations may be distributed among the one or more processors, not only residing within a single machine, but deployed across a number of machines. In some example embodiments, the processor or processors may be located in a single location (e.g., within a home environment, an office environment or as a server farm), while in other embodiments the processors may be distributed across a number of geographic locations.

Unless specifically stated otherwise, discussions herein using words such as "processing," "computing," "calculating," "determining," "presenting," "displaying," or the like may refer to actions or processes of a machine (e.g., a computer) that manipulates or transforms data represented as physical (e.g., electronic, magnetic, or optical) quantities within one or more memories (e.g., volatile memory, non-volatile memory, or a combination thereof), registers, or other machine components that receive, store, transmit, or display information.

As used herein any reference to "one embodiment" or "an embodiment" means that a particular element, feature, structure, or characteristic described in connection with the embodiment may be included in at least one embodiment. The appearances of the phrase "in one embodiment" in various places in the specification are not necessarily all referring to the same embodiment.

Some embodiments may be described using the expression "coupled" and "connected" along with their derivatives. For example, some embodiments may be described using the term "coupled" to indicate that two or more elements are in direct physical or electrical contact. The term "coupled," however, may also mean that two or more elements are not in direct contact with each other, but yet still co-operate or interact with each other. The embodiments are not limited in this context.

As used herein, the terms "comprises," "comprising," "includes," "including," "has," "having" or any other variation thereof, are intended to cover a non-exclusive inclusion. For example, a process, method, article, or apparatus that comprises a list of elements is not necessarily limited to only those elements but may include other elements not expressly listed or inherent to such process, method, article, or apparatus. Further, unless expressly stated to the contrary, "or" refers to an inclusive or and not to an exclusive or. For example, a condition A or B is satisfied by any one of the following: A is true (or present) and B is false (or not present), A is false (or not present) and B is true (or present), and both A and B are true (or present).

In addition, use of the "a" or "an" are employed to describe elements and components of the embodiments herein. This is done merely for convenience and to give a general sense of the description. This description, and the claims that follow, should be read to include one or at least one and the singular also includes the plural unless it is obvious that it is meant otherwise.

Upon reading this disclosure, those of skill in the art will appreciate still additional alternative structural and functional designs for the approaches described herein. Thus, while particular embodiments and applications have been illustrated and described, it is to be understood that the disclosed embodiments are not limited to the precise construction and components disclosed herein. Various modifications, changes and variations, which will be apparent to those skilled in the art, may be made in the arrangement, operation and details of the method and apparatus disclosed herein without departing from the spirit and scope defined in the appended claims.

The particular features, structures, or characteristics of any specific embodiment may be combined in any suitable manner and in any suitable combination with one or more other embodiments, including the use of selected features without corresponding use of other features. In addition, many modifications may be made to adapt a particular application, situation or material to the essential scope and spirit of the present invention. It is to be understood that other variations and modifications of the embodiments of the present invention described and illustrated herein are possible in light of the teachings herein and are to be considered part of the spirit and scope of the present invention.

While the preferred embodiments of the invention have been described, it should be understood that the invention is not so limited and modifications may be made without departing from the invention. The scope of the invention is defined by the appended claims, and all devices that come within the meaning of the claims, either literally or by equivalence, are intended to be embraced therein.

It is therefore intended that the foregoing detailed description be regarded as illustrative rather than limiting, and that it be understood that it is the following claims, including all equivalents, that are intended to define the spirit and scope of this invention.

Furthermore, the patent claims at the end of this patent application are not intended to be construed under 35 U.S.C. § 112(f) unless traditional means-plus-function language is expressly recited, such as "means for" or "step for" language being explicitly recited in the claim(s). The systems and methods described herein are directed to an improvement to computer functionality, and improve the functioning of conventional computers.

What is claimed:

1. A computer-implemented method for distributed ledger-based identity verification, the method comprising:
   receiving, via one or more processors, from a user device of a first user, user-provided identity information including facial identification data;
   scraping, via the one or more processors, from a website, data of the first user;
   adding, via the one or more processors, the scraped data of the first user to a distributed ledger, wherein the distributed ledger includes a profile of a second user, the second user is different than the first user, and the profile of the second user includes identity information of the second user; and
   attempting, via the one or more processors, to authenticate the first user by inputting, into a smart contract stored on the distributed ledger: (i) the user-provided identity information, and (ii) the identity information of the second user, wherein the smart contract is configured to not authenticate the first user if the user-provided identity information matches the identity information of the second user.

2. The computer-implemented method of claim 1, further comprising adding the scraped data of the first user to a user profile of the first user stored on the distributed ledger; and
   wherein the attempting to authenticate the first user includes inputting the scraped data of the first user from the user profile into the smart contract stored on the distributed ledger.

3. The computer-implemented method of claim 1, further comprising adding the scraped data of the first user to a user profile of the first user stored on the distributed ledger including mapping, via a mapping machine learning model, the scraped data of the first user to the user profile of the first user.

4. The computer-implemented method of claim 1, further comprising adding, via the one or more processors, to a user profile of the first user stored on the distributed ledger, the user-provided identity information along with a date that the user-provided identity information was added to the user profile.

5. The computer-implemented method of claim 1, wherein:
   the scraping includes identifying, via the one or more processors, an image of the first user on the website; and
   the attempting to authenticate the first user includes comparing the facial identification data to the image.

6. The computer-implemented method of claim 1, wherein the user-provided identity information further includes at least one of: fingerprint data; retina data; voice identification data; or personal data.

7. The computer-implemented method of claim 1, wherein:
   attempting to authenticate the first user includes determining, via the one or more processors and the smart contract, that the user-provided identity information does not include enough information to authenticate the first user; and
   the method further comprises, in response to the determination that the user-provided identity information does not include enough information to authenticate the first user, prompting, via the one or more processors and a chatbot, the first user to provide additional user-provided identity information.

8. The computer-implemented method of claim 1, further comprising:

analyzing, via the one or more processors and a chatbot, the attempting to authenticate the first user to determine an explanation for why or why not the first user was authenticated; and presenting, via the one or more processors and the chatbot, the explanation for why or why not the first user was authenticated.

9. A computer system for distributed ledger-based identity verification, the computer system comprising one or more processors configured to:

receive, from a user device of a first user, user-provided identity information including facial identification data;

scrape, from a website, data of the first user;

add the scraped data of the first user to a distributed ledger, wherein the distributed ledger includes a profile of a second user, the second user is different than the first user, and the profile of the second user includes identity information of the second; and attempt to authenticate the first user by inputting, into a smart contract stored on the distributed ledger: (i) the user-provided identity information, and (ii) the identity information of the second user, wherein the smart contract is configured to not authenticate the first user if the user-provided identity information matches the identity information of the second user.

10. The computer system of claim 9, further comprising a display, and wherein the one or more processors are configured to:

analyze, via a chatbot, the attempt to authenticate the first user to determine an explanation for why or why not the first user was authenticated; and display the explanation for why or why not the first user was authenticated on the display.

11. The computer system of claim 9, wherein the one or more processors are further configured to add the scraped data of the first user to a user profile of the first user stored on the distributed ledger; and wherein the attempt to authenticate the first user includes inputting the scraped data of the first user from the user profile into the smart contract stored on the distributed ledger.

12. The computer system of claim 9, wherein the one or more processors are further configured to map, via a mapping machine learning model, the scraped data of the first user to a user profile of the first user.

13. The computer system of claim 9, wherein the user-provided identity information further includes at least one of: fingerprint data; retina data; voice identification data; or personal data.

14. A computer device for distributed ledger-based identity verification, the computer device comprising:

one or more processors; and one or more non-transitory memories, the one or more non-transitory memories having stored thereon computer-executable instructions that, when executed by the one or more processors, cause the one or more processors to:

receive, from a user device of a first user, user-provided identity information including facial identification data;

scrape, from a website, data of the first user;

add the scraped data of the first user to a distributed ledger, wherein the distributed ledger includes a profile of a second user, the second user is different than the first user, and the profile of the second user includes identity information of the second; and attempt to authenticate the first user by inputting, into a smart contract stored on the distributed ledger: (i) the user-provided identity information, and (ii) the identity information of the second user, wherein the smart contract is configured to not authenticate the first user if the user-provided identity information matches the identity information of the second user.

15. The computer device of claim 14, further comprising a display, and wherein the one or more non-transitory memories having stored thereon computer-executable instructions that, when executed by the one or more processors, cause the one or more processors to:

analyze, via a chatbot, the attempt to authenticate the first user to determine an explanation for why or why not the first user was authenticated; and display the explanation for why or why not the first user was authenticated on the display.

16. The computer device of claim 14, the one or more non-transitory memories having stored thereon computer-executable instructions that, when executed by the one or more processors, cause the one or more processors to add the scraped data of the first user to a user profile of the first user stored on the distributed ledger; and wherein the attempt to authenticate the first user includes inputting the scraped data of the first user from the user profile into the smart contract stored on the distributed ledger.

17. The computer device of claim 14, the one or more non-transitory memories having stored thereon computer-executable instructions that, when executed by the one or more processors, cause the one or more processors to map, via a mapping machine learning model, the scraped data of the first user to a user profile of the first user.

18. The computer device of claim 14, wherein the user-provided identity information further includes at least one of: fingerprint data; retina data; voice identification data; or personal data.

19. The computer device of claim 14, wherein the user-provided identity information includes all of: fingerprint data; retina data; voice identification data; and personal data.

* * * * *